United States Patent
Sakhnini et al.

(10) Patent No.: US 12,284,598 B2
(45) Date of Patent: Apr. 22, 2025

(54) DEDICATED SIB1 DURING IDLE STATE RESELECTION

(71) Applicant: QUALCOMM Incorporated, San Diego, CA (US)

(72) Inventors: Iyab Issam Sakhnini, San Diego, CA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/662,757

(22) Filed: May 10, 2022

(65) Prior Publication Data

US 2023/0370955 A1  Nov. 16, 2023

(51) Int. Cl.
*H04W 48/20* (2009.01)
*H04W 48/14* (2009.01)
*H04W 48/16* (2009.01)
*H04W 72/02* (2009.01)

(52) U.S. Cl.
CPC ........... *H04W 48/14* (2013.01); *H04W 48/16* (2013.01); *H04W 48/20* (2013.01); *H04W 72/02* (2013.01)

(58) Field of Classification Search
CPC ..... H04W 48/14; H04W 48/16; H04W 48/20; H04W 72/02; H04W 48/12
See application file for complete search history.

(56) References Cited

U.S. PATENT DOCUMENTS

| | | | |
|---|---|---|---|
| 2019/0306784 A1* | 10/2019 | Chen | H04W 76/15 |
| 2020/0221372 A1* | 7/2020 | Shih | H04W 76/25 |
| 2022/0361091 A1* | 11/2022 | Kang | H04W 48/14 |

* cited by examiner

*Primary Examiner* — Hanh N Nguyen
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may selectively transmit, to a network entity, a request for a dedicated system information block type 1 (SIB1) for a target cell based at least in part a determination of whether an SIB1 request criterion is satisfied for an idle state cell reselection from a source cell to the target cell. The UE may receive, from the network entity, an indication of one or more target cell SIB1 parameters included in the dedicated SIB1 for the target cell, based at least in part on transmitting the request for the dedicated SIB1 for the target cell. Numerous other aspects are provided.

30 Claims, 10 Drawing Sheets

DEDICATED SIB1 DURING IDLE STATE RESELECTION

FIELD OF THE DISCLOSURE

Aspects of the present disclosure generally relate to wireless communication and specifically, to techniques and apparatuses for dedicated system information block type 1 (SIB1) during idle state reselection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

The use a dedicated system information block type 1 (SIB1), which is transmitted from a network entity to a user equipment (UE) on an on-demand basis, may reduce an overhead of resources consumed by initial access channels for cell. However, the use of a dedicated SIB1 may result in increased overhead and delays during idle state cell reselection.

SUMMARY

Some aspects described herein relate to a user equipment (UE) for wireless communication. The UE may include at least one processor and at least one memory, communicatively coupled with the at least one processor, that stores processor-readable code. The processor-readable code, when executed by the at least one processor, may be configured to cause the user equipment to selectively transmit, to a network entity, a request for a dedicated system information block type 1 (SIB1) for a target cell based at least in part a determination of whether an SIB1 request criterion is satisfied for an idle state cell reselection from a source cell to the target cell. The processor-readable code, when executed by the at least one processor, may be configured to cause the user equipment to receive, from the network entity, an indication of one or more target cell SIB1 parameters included in the dedicated SIB1 for the target cell, based at least in part on transmitting the request for the dedicated SIB1 for the target cell.

Some aspects described herein relate to a network entity for wireless communication. The network entity may include at least one processor and at least one memory, communicatively coupled with the at least one processor, that stores processor-readable code. The processor-readable code, when executed by the at least one processor, may be configured to cause the network entity to receive, from a UE, a request for a dedicated SIB1 for a target cell in connection with a determination that an SIB1 request criterion is satisfied for an idle state reselection from a source cell to the target cell. The processor-readable code, when executed by the at least one processor, may be configured to cause the network entity to transmit, to the UE, an indication of one or more target cell SIB1 parameters included in the dedicated SIB1 for the target cell, based at least in part on receiving the request for the dedicated SIB1 for the target cell.

Some aspects described herein relate to a method of wireless communication performed by a UE. The method may include selectively transmitting, to a network entity, a request for a dedicated SIB1 for a target cell based at least in part a determination of whether an SIB1 request criterion is satisfied for an idle state cell reselection from a source cell to the target cell. The method may include receiving, from the network entity, an indication of one or more target cell SIB1 parameters included in the dedicated SIB1 for the target cell, based at least in part on transmitting the request for the dedicated SIB1 for the target cell.

Some aspects described herein relate to a method of wireless communication performed by a network entity. The method may include receiving, from a UE, a request for a dedicated SIB1 for a target cell in connection with a determination that an SIB1 request criterion is satisfied for an idle state reselection from a source cell to the target cell. The method may include transmitting, to the UE, an indication of one or more target cell SIB1 parameters included in the dedicated SIB1 for the target cell, based at least in part on receiving the request for the dedicated SIB1 for the target cell.

Some aspects described herein relate to a non-transitory computer-readable medium that stores a set of instructions for wireless communication by a UE. The set of instructions, when executed by one or more processors of the UE, may cause the UE to selectively transmit, to a network entity, a request for a dedicated SIB1 for a target cell based at least in part a determination of whether an SIB1 request criterion is satisfied for an idle state cell reselection from a source cell to the target cell. The set of instructions, when executed by one or more processors of the UE, may cause the UE to receive, from the network entity, an indication of one or more target cell SIB1 parameters included in the dedicated SIB1 for the target cell, based at least in part on transmitting the request for the dedicated SIB1 for the target cell.

Some aspects described herein relate to a non-transitory computer-readable medium that stores a set of instructions for wireless communication by a network entity. The set of instructions, when executed by one or more processors of the network entity, may cause the network entity to receive, from a UE, a request for a dedicated SIB1 for a target cell in connection with a determination that an SIB1 request criterion is satisfied for an idle state reselection from a source cell to the target cell. The set of instructions, when executed by one or more processors of the network entity, may cause the network entity to transmit, to the UE, an indication of one or more target cell SIB1 parameters included in the dedicated SIB1 for the target cell, based at least in part on receiving the request for the dedicated SIB1 for the target cell.

Some aspects described herein relate to an apparatus for wireless communication. The apparatus may include means for selectively transmitting, to a network entity, a request for a dedicated SIB1 for a target cell based at least in part a determination of whether an SIB1 request criterion is satisfied for an idle state cell reselection from a source cell to the target cell. The apparatus may include means for receiving, from the network entity, an indication of one or more target cell SIB1 parameters included in the dedicated SIB1 for the target cell, based at least in part on transmitting the request for the dedicated SIB1 for the target cell.

Some aspects described herein relate to an apparatus for wireless communication. The apparatus may include means for receiving, from a UE, a request for a dedicated SIB1 for a target cell in connection with a determination that an SIB1 request criterion is satisfied for an idle state reselection from a source cell to the target cell. The apparatus may include means for transmitting, to the UE, an indication of one or more target cell SIB1 parameters included in the dedicated SIB1 for the target cell, based at least in part on receiving the request for the dedicated SIB1 for the target cell.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
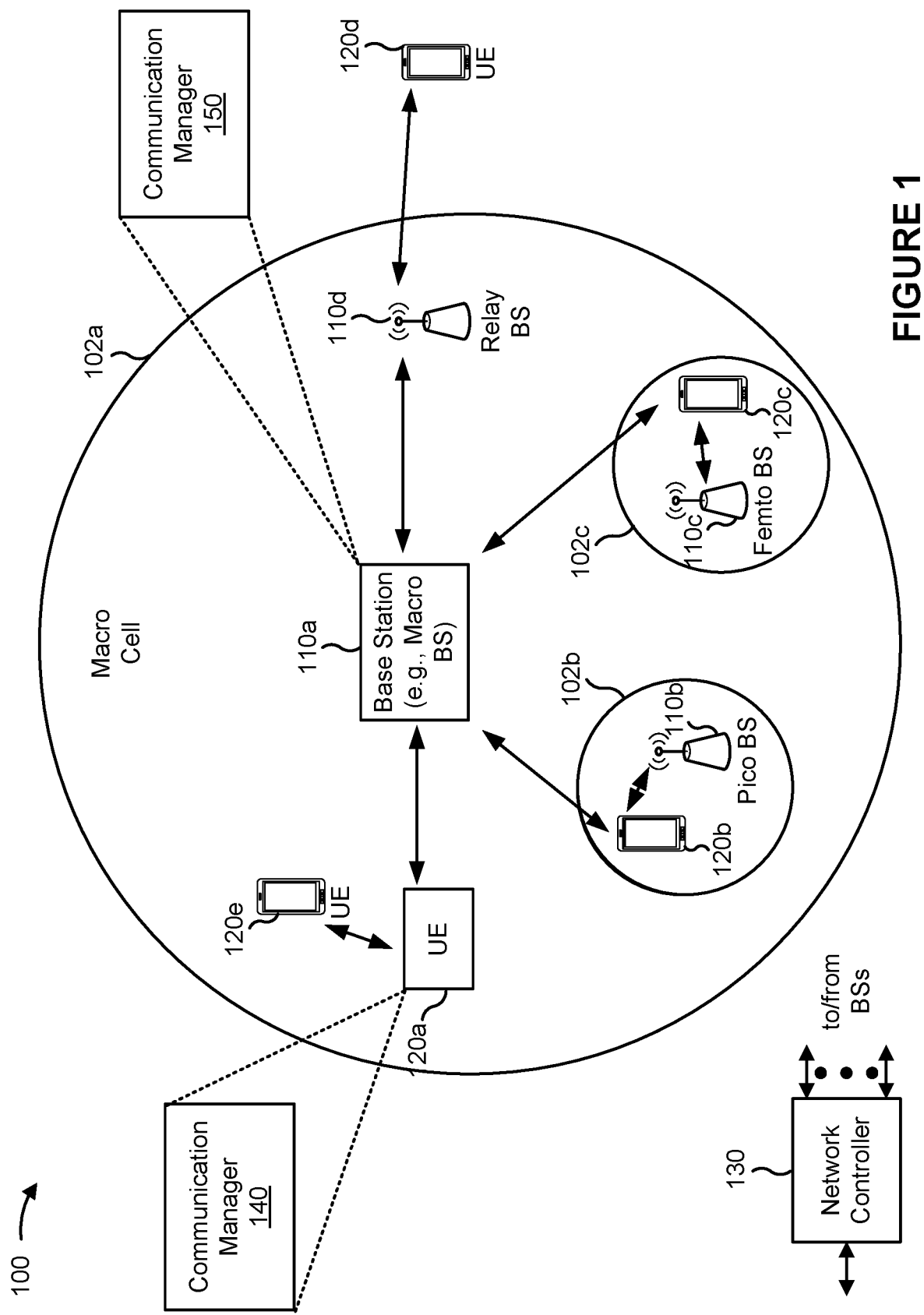
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects generally relate to idle state cell reselection to a target cell with a dedicated system information block type 1 (SIB1). Some aspects more specifically relate to a user equipment (UE) selectively transmitting, to a network entity (for example, a network entity associated with a source cell or a target cell), a request for a dedicated SIB1 for the target cell based at least in part on a determination of whether an SIB1 request criterion is satisfied for an idle state cell reselection from the source cell to the target cell. In some aspects, the UE may transmit the request for the dedicated SIB1 for the target cell in connection with a determination that the SIB1 request criterion is satisfied. In some aspects, the UE may select not to transmit the request for the dedicated SIB1 for the target cell in connection with a determination that the SIB1 request criterion is not satisfied.

Particular aspects of the subject matter described in this disclosure can be implemented to realize one or more of the following potential advantages. In some examples, the described techniques can be used to reduce overhead and delays associated with requesting a dedicated SIB1 during idle state cell reselection.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may selectively transmit, to a network entity, a request for a dedicated SIB1 for a target cell based at least in part on a determination of whether an SIB1 request criterion is satisfied for an idle state reselection from a source cell to the target cell; and receive, from the network entity, an indication of one or more target cell SIB1 parameters included in the dedicated SIB1 for the target cell, based at least in part on transmitting the request for the dedicated SIB1 for the target cell. Additionally or alternatively, the communication manager 140 may perform one or more other operations described herein.

In some aspects, a network entity (for example, a base station 110 or one or more components described in connection with FIG. 3) may include a communication manager 150. As described in more detail elsewhere herein, the communication manager 150 may receive, from a UE, a request for a dedicated SIB1 for a target cell in connection with a determination that an SIB1 request criterion is satisfied for an idle state reselection from a source cell to the target cell; and transmit, to the UE, an indication of one or more target cell SIB1 parameters included in the dedicated SIB1 for the target cell, based at least in part on receiving the request for the dedicated SIB1 for the target cell. Additionally or alternatively, the communication manager 150 may perform one or more other operations described herein.

Figure 2:
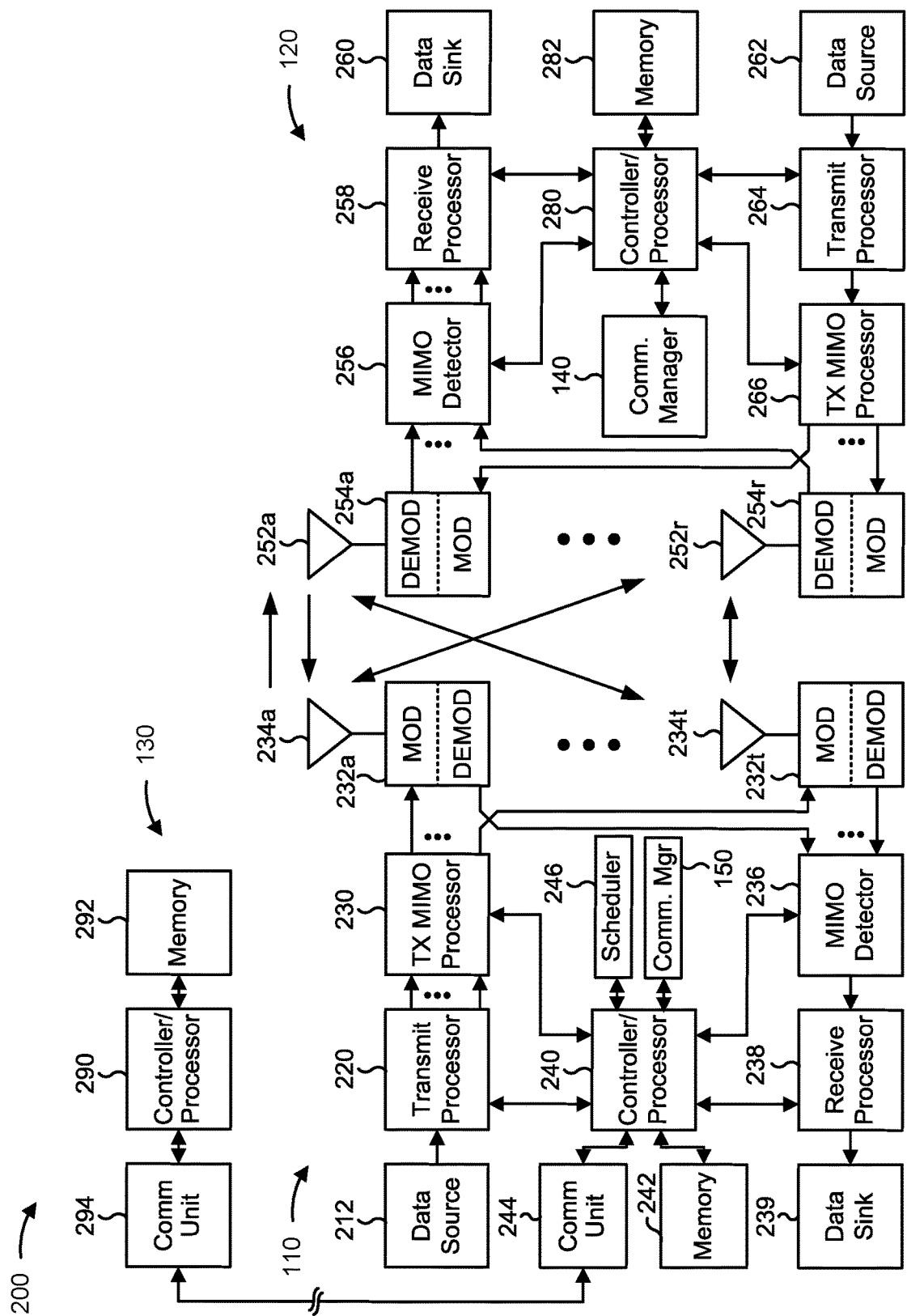
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the base station 110 or other base stations 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with dedicated SIB1 during idle state reselection, as described in more detail elsewhere herein. For example, the controller/processor 240 of the base station 110, the controller/processor 280 of the UE 120, or any other component(s) of FIG. 2 may perform or direct operations of, for example, process 700 of FIG. 7, process 800 of FIG. 8, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, process 800 of FIG. 8, or other processes as described herein. In some examples, executing instructions may include running the instructions, converting the instructions, compiling the instructions, or interpreting the instructions, among other examples. In some aspects, a network entity described herein is the base station 110, is included in the base station 110, or includes one or more components of the base station 110 shown in FIG. 2.

In some aspects, the UE 120 includes means for selectively transmitting, to a network entity, a request for a dedicated SIB1 for a target cell based at least in part on a determination of whether an SIB1 request criterion is satisfied for an idle state reselection from a source cell to the target cell; and means for receiving, from the network entity, an indication of one or more target cell SIB1 parameters included in the dedicated SIB1 for the target cell, based at least in part on transmitting the request for the dedicated SIB1 for the target cell. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for receiving, from a UE, a request for a dedicated SIB1 for a target cell in connection with a determination that an SIB1 request criterion is satisfied for an idle state reselection from a source cell to the target cell; and means for transmitting, to the UE, an indication of one or more target cell SIB1 parameters included in the dedicated SIB1 for the target cell, based at least in part on receiving the request for the dedicated SIB1 for the target cell. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
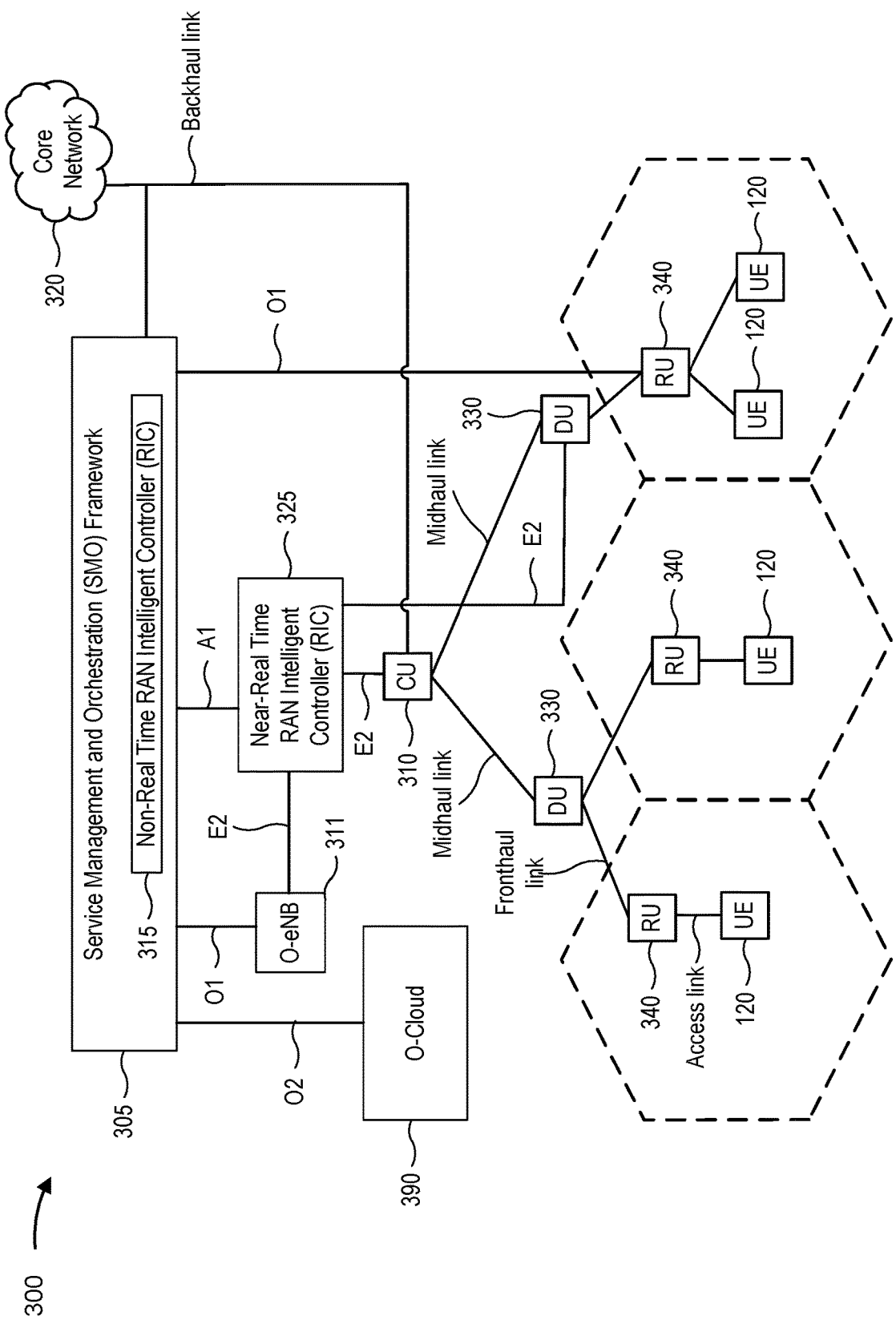
FIG. 3 is a diagram illustrating an example of a disaggregated base station architecture in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, for example, base station 110), or one or more units (or one or more components) performing base station functionality, may be implemented in an aggregated or disaggregated architecture. For example, a BS (such as a Node B (NB), eNB, NR BS, 5G NB, access point (AP), a TRP, or a cell) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as, a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access and backhaul (IAB) network, an open radio access network (O-RAN) (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a near real time RAN intelligent controller (Near-RT RIC) 325 via an E2 link, or a non-real time RAN intelligent control (Non-RT RIC) 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), or service data adaptation protocol (SDAP). Each control function can be implemented with an interface configured to communicate signals with other control functions hosted by the CU 310. The CU 310 may be configured to handle user plane functionality (for example, Central Unit-User Plane (CU-UP)), control plane functionality (for example, Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, or modulation and demodulation) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, or physical random access channel (PRACH) extraction and filtering), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Sixth generation (6G) wireless systems may consider a millimeter wave redesign. Some challenges expected for 6G wireless systems include path loss in millimeter wave bands, blockage from objects (for example, hands, body, or foliage), the smartphone form factor, maximum permissible exposure requirements, beam pairing, beam tracking, beam recovery, densification of networks, or power efficiency. To address these challenges, new designs are being considered for low latency and overhead beam management (for example, autonomous beam management), seamless mobility across nodes (for example, gNBs, relays, and repeaters), topology enhancements for densifying networks, power efficient RF front-ends and beamforming, waveform and modulation for improved power efficiency, usage of different bands (for example, sub-THz), uplink coverage enhancements, power savings for the UE and gNB, power efficient physical layer operations and procedures, or sidelink operation enhancements.

Figure 4:
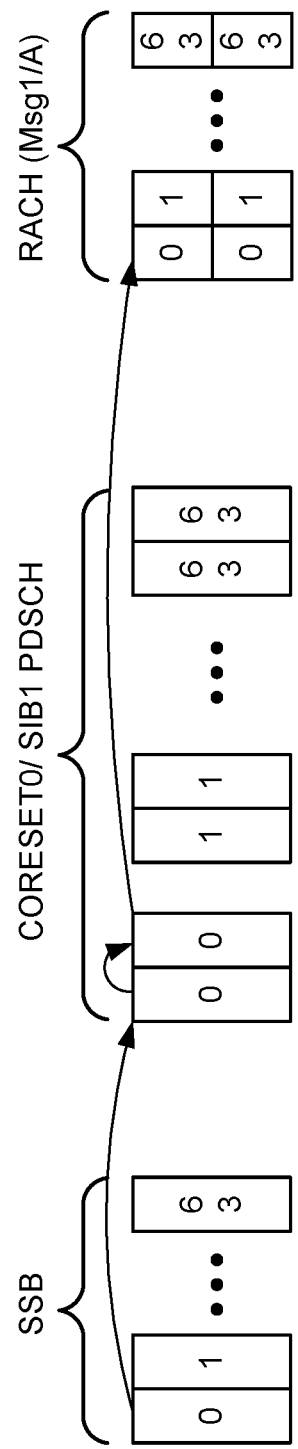
FIG. 4 is a diagram illustrating an example of an initial access in accordance with the present disclosure.

FIG. 4 is a diagram illustrating an example 400 of an initial access, in accordance with the present disclosure.

As shown in FIG. 4, in a 5G NR system, during an initial access, a network entity may transmit up to 64 synchronization signal block (SSB) beams. The network entity may transmit the SSB beams using time division multiplexing (TDM). The network entity may transmit the SSB beams based at least in part on a beam sweep. During a cell search, a UE may detect one of the SSB beams. In other words, the UE may detect an SSB from a particular beam. A master information block (MIB) associated with the SSB may configure a control resource set (CORESET) 0 and a search space set type 0. The network entity may transmit downlink control information (DCI) (for example, DCI format 1_0) based at least in part on the CORESET 0 and the search space set type 0, where the DCI may be cyclic redundancy check (CRC) scrambled by a system information radio network temporary identifier (SI-RNTI). The network entity may transmit the DCI via a physical downlink shared channel (PDSCH). The UE may detect the DCI. The DCI may schedule remaining minimum system information (RMSI), which may include a SIB1 (for example, a SIB1 PDSCH). The SIB1 may configure a random access channel (RACH). The UE may transmit a RACH message to the network entity on a RACH occasion based at least in part on the SIB1, where the RACH occasion may be configured by the network entity. The RACH message may be a message 1 (Msg1) or message A (MsgA) of a RACH procedure. The UE may access the network entity based at least in part on the RACH procedure.

The 5G NR system may support up to 64 SSBs, up to 64 CORESET 0s, up to 64 SIB1 PDSCHs, and up to 64 RACHs. In other words, an SSB, a CORESET 0, a SIB1 PDSCH, and a RACH may be per beam, and resources may be reserved per beam. In other words, a plurality of initial access channels and messages (for example, all initial access channels or messages) may be repeated per beam, with up to 64 separate beams, which may contribute to an initial access overhead.

As an example, the 5G NR system may be a 400 MHz system with a subcarrier spacing (SCS) of 120 kHz. The 5G NR system may employ 64 wide beams. The 5G NR system may provide a CORESET 0, which may be associated with one OFDM symbol and 48 resource blocks (RBs). The 5G NR system may provide a SIB1 PDSCH, which may be associated with 7 OFDM symbols and 48 RBs. The 5G NR system may employ a RACH, where 6 OFDM symbols may be per RACH occasion, two RACH occasions may be per slot, and a one-to-one SSB to resource occasion mapping may occur. In the 5G NR system may, a periodicity for an SSB, the CORESET 0, the SIB1 PDSCH, and the RACH may be 20 milliseconds (ms). The 5G NR system may employ a time division duplexing (TDD) configuration of "DDDSU", where "D" represents a downlink slot, "S" represents a special slot, and "U" indicates an uplink slot. In this example, the SSB may consume about 1.1% of available downlink resources, the CORESET 0 may consume about 1.3% of the available downlink resources, and the SIB1 PDSCH may consume about 4.6% of the available downlink resources. The RACH may consume about 3.7% of available uplink resources. An initial access (for example, SSB, CORESET 0, SIB1 PDSCH, and RACH) may consume about 7% of the total available downlink resources, and the initial access may consume about 6.2% of the total available downlink and uplink resources. The SIB1 PDSCH may consume about 66% of the downlink resources used for the initial access, and the SIB1 PDSCH may consume about 56% of the downlink and uplink resources used for the initial access. Thus, the initial access, and the SIB1 PDSCH in particular, may cause a considerable amount of overhead for the 5G NR system.

In some examples, to address this overhead issue, in an initial access procedure, a network entity may transmit a dedicated CORESET 0 or a dedicated SIB1 PDSCH. The network entity may transmit the dedicated CORESET 0 or the dedicated SIB1 PDSCH based at least in part on a request received from a UE. The network entity may transmit the dedicated CORESET 0 or the dedicated SIB1 PDSCH on an on-demand basis. For example, the network entity may transmit a plurality of SSB beams. The UE may detect one of the SSB beams. In other words, the UE may detect an SSB from a particular beam. The UE may transmit, to the network entity, a RACH message using that beam, and the RACH message may indicate the request. The network entity may transmit the dedicated SIB1 PDSCH based at least in part on the request indicated in the RACH message. The network may transmit the SIB1 PDSCH only on the beam used by the UE. By transmitting the SIB1 PDSCH only on the beam used by the UE (as compared with repeating the transmission of the SIB1 on all of the beams), a SIB1 PDSCH overhead may be reduced from consuming 4.6% of available downlink resources to consuming 0.1% of available downlink resources. Further, an initial access overhead may be reduced from consuming 7% of the total available downlink resources to consuming 2.5% of the total available downlink resources.

In some examples, a UE may need the RMSI for a neighbor cell, and during idle state cell reselection, the UE may read the SIB1 content of the neighbor cell. However, in a case in which the neighbor cell uses a dedicated SIB1 (for example, a SIB1 transmitted on an on-demand basis), the UE may need to transmit a request for the SIB1 of the neighbor cell during the idle state cell reselection. This may result in increased RACH overhead and delays for the idle state cell reselection.

Various aspects generally relate to idle state cell reselection to a target cell with a dedicated SIB1. Some aspects more specifically relate to a UE selectively transmitting, to a network entity (for example, a network entity associated with a source cell or a target cell), a request for a dedicated SIB1 for the target cell based at least in part on a determination of whether an SIB1 request criterion is satisfied for an idle state cell reselection from the source cell to the target cell. In some aspects, the UE may transmit the request for the dedicated SIB1 for the target cell in connection with a determination that the SIB1 request criterion is satisfied, and the UE may receive, from the network entity, an indication of one or more target cell SIB1 parameters included in the dedicated SIB1 for the target cell, based at least in part on transmitting the request for the dedicated SIB1 for the target cell. In some aspects, the UE may select not to transmit the request for the dedicated SIB1 for the target cell in connection with a determination that the SIB1 request criterion is not satisfied. In such aspects, the UE may use source cell SIB1 parameters on the target cell.

Particular aspects of the subject matter described in this disclosure can be implemented to realize one or more of the following potential advantages. In some examples, the described techniques can be used to reduce a quantity of requests for dedicated SIB1s during idle cell reselection, which may reduce overhead and delays caused by requesting a dedicated SIB1 during idle state cell reselection.

Figure 5:
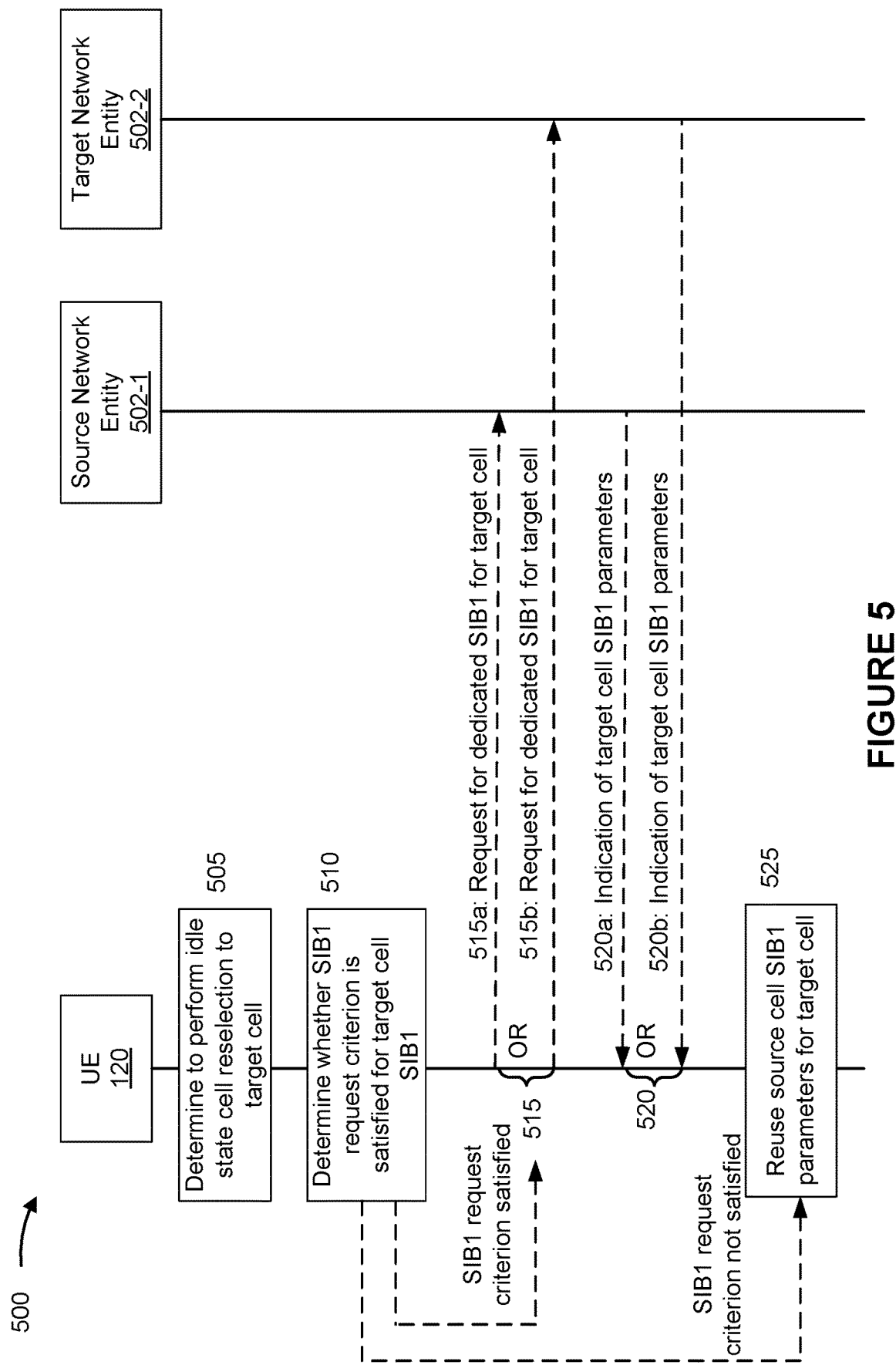
FIGS. 5-6 are diagrams illustrating examples associated with dedicated system information block type 1 (SIB1) during idle state reselection in accordance with the present disclosure.

FIG. 5 is a diagram illustrating an example 500 associated with dedicated SIB1 during idle state reselection, in accordance with the present disclosure. As shown in FIG. 5, example 500 includes a UE 120 and network entities 502 (for example, a source network entity 502-1 and a target network entity 502-2). For example, the network entities 502 may be base stations 110, CUs 310, DUs 330, RUs 340, or a combination thereof. In some aspects, the UE 120 and the network entities 502 may be included in a wireless network, such as wireless network 100. The network entities 502 and the UE 120 may communicate via a wireless access links, which may include uplinks and downlinks.

As shown in FIG. 5, in a first operation 505, the UE 120 may determine to perform idle state cell reselection to a target cell. The UE 120 may be in an idle state (for example, an RRC idle state), and the UE 120 may be "camped" on a serving cell in the idle state. "Camping" on a serving cell refers to a procedure in which the UE 120 monitors a control channel of the serving cell while in the idle state. While camped on the serving cell idle, the UE 120 may monitor one or more control channels of the serving cell for system information associated with the serving cell. The UE 120, while camped on the serving cell in the idle mode, may also monitor one or more paging channels of the serving cell, in accordance with the system information, to receive paging and notification messages from a network entity 502 associated with the serving cell. The UE 120, while camped on the serving cell in the idle mode, may also perform cell reselection measurements and perform cell reselection evaluation based at least in part on the cell reselection measurements. For example, the UE 120 may measure a signal power or quality for the serving cell, and the UE 120 may initiate the cell reselection evaluation based at least in part on the measured power or quality for the serving cell. During the cell reselection evaluation, the UE 120 may perform power or quality measurements for one or more neighboring cells to the serving cell, and the UE 120 may determine a ranking of the neighboring cells and the serving cell based at least in part on the power and quality measurements.

The UE 120 may determine whether to perform idle state cell reselection to a neighboring cell based at least in part on the cell reselection evaluation. In some aspects, the UE 120 may determine to determine perform idle state cell reselection to a neighboring cell. Idle cell reselection is a procedure in which the UE 120 switches the serving cell on which the UE 120 is camped from a source cell (for example, the current serving cell) to a target cell (for example, the neighboring selected as the new serving cell). In some aspects, the source network entity 502-1 may be a network entity associated with the source, and the target network entity 502-2 may be a network entity associated with the target cell.

As further shown in FIG. 5, in a second operation 510, the UE 120 may determine whether an SIB1 request criterion is satisfied for a target cell SIB1. In some aspects, the target cell SIB1 may be a dedicated SIB1 for the target cell (for example, an SIB1 for the target cell that is transmitted by the target network entity 502-2 on an on-demand basis). The SIB1 request criterion may be a criteria associated with the idle state reselection from the source cell to the target cell that is used by the UE 120 to determine whether the UE 120 is to request the dedicated SIB1 for the target cell during the idle state cell reselection to the target cell. In some aspects, the SIB1 request criterion may be configured for the UE 120 by a network entity 502. For example, the SIB1 may be indicated in source cell system information transmitted by the source network entity 502-1 and received by the UE 120. In some aspects, the SIB1 criterion may be stored on the UE 120. For example, the SIB1 criterion may specified in a wireless communication standard. In some aspects, the SIB1 criterion may relate to changes between contents of the source cell SIB1 (for example, a dedicated SIB1 associated with the source cell) and the target cell SIB1.

In some aspects, an SIB1 may be associated with an SIB1 version, and different SIB1 versions may correspond to the different sets of SIB1 parameters. In some aspects, the UE 120 may determine whether the SIB1 request criterion is satisfied based at least in part on a determination of whether a first SIB1 version associated with the source cell SIB1 is different from a second SIB1 version associated with the target cell SIB1. For example, the SIB1 request criterion may be satisfied when the source cell SIB1 and the target cell SIB1 are associated with different SIB1 versions (for example, the first SIB1 version is different from the second SIB1 version), and the SIB1 may not be satisfied when the source cell SIB1 and the target cell SIB1 are associated with the same SIB1 version (for example, the first SIB1 version is the same as the second SIB1 version). In some aspects, the SIB1 version for the SIB1 for a cell may be indicated in the MIB for the cell. For example, the UE 120 may receive an indication of the first SIB1 version in the MIB of the source cell (for example, transmitted by the source network entity 502-1), and the UE 120 may receive an indication of the second SIB1 version in the MIB of the target cell (for example, transmitted by the target network entity 502-2). In some other aspects, the source network entity 502-1 may transmit, and the UE 120 may receive, a control channel communication (for example, a physical downlink control channel (PDCCH) communication) that indicates the first SIB1 version associated with the source cell SIB1 and the second SIB1 version associated with the target cell SIB1.

In some aspects, the UE 120 may determine whether the SIB1 request criterion is satisfied based at least in part on a frequency change between the source cell and the target cell. That is, the UE 120 may whether the SIB1 request criterion is satisfied based at least in part on a determination of whether a first frequency associated with the source cell is different from a second frequency associated with the target cell. For example, the SIB1 request criterion may be satisfied if the frequency for the source cell (for example, the first frequency) is different than the frequency for the target cell (for example, the second frequency), and the SIB1 request criterion may not be satisfied if the frequency for the source cell (for example, the first frequency) is the same as the frequency for the target cell (for example, the second frequency). In such examples, the SIB1 request criterion may be satisfied in cases of inter-frequency cell reselection, and the SIB1 request criterion may not be satisfied in cases of intra-frequency cell reselection.

In some aspects, the SIB1 request criterion may be based at least in part on a time-based criterion. In some aspects, the UE 120 may determine whether the SIB1 request criterion is satisfied based at least in part on a determination of whether a time duration from a previous time that the target cell was the serving cell for the UE 120 satisfies a threshold. For example, the SIB1 request criterion may be satisfied if the time duration between the previous time that the target cell was the serving cell for the UE 120 and the idle state cell reselection satisfies (for example, is greater than) a threshold, and the SIB1 request criterion may not be satisfied if the time duration between the previous time that the target cell was the serving cell for the UE 120 and the idle state cell reselection does not satisfy (for example, is not greater than) the threshold. In such examples, the threshold may be based at least in part on a network timing for changing a SIB1 for a cell.

In some aspects, the source cell (for example, the source network entity 502-1) may transmit an indication to the UE 120 (for example, in the source cell system information or in a paging message) that indicates that the UE 120 is to request the target cell SIB1. For example, the source network entity 502-1 may transmit the indication to the UE 120 based at least in part on a determination that target cell SIB1 has been changed recently. In such examples, the UE 120 may determine whether the SIB1 request criterion is satisfied based at least in part on a determination of whether an indication to request the target cell SIB1 is received by the UE 120 via the source cell (for example, from the source network entity 502-1). For example, the SIB1 request criterion may be satisfied if the UE 120 receives the indication to request the target cell SIB1, and SIB1 request criterion may not be satisfied if the UE 120 does not receive the indication to request the target cell SIB1.

In some aspects, the SIB1 request criterion may be based at least in part on a physical cell identifier (PCI) associated with the target cell. In some aspects, the UE 120 may receive, via the source cell (for example, from the source network entity 502-1), an indication of one or more PCIs for which the SIB1 request criterion is satisfied. For example, the indication of the one or more PCIs for which the SIB1 request criterion is satisfied may be included in source cell system information transmitted by the source network entity 502-1 and received by the UE 120. In such examples, the UE 120 may determine whether the SIB1 request criterion is satisfied is based at least in part on a determination of whether the PCI associated with the target cell is included in the one or more physical cell identifiers for which the SIB1 request criterion is satisfied. In some aspects, the source cell (for example, the source network entity 502-1) may also indicate (for example, in the source cell system information) one or more PCIs for which the SIB1 request criterion is not satisfied.

In some aspects, the SIB1 criteria may be based at least in part on a beam identifier (ID) for a beam associated with the target cell. In some aspects, the UE 120 may receive, via the source cell (for example, from the source network entity 502-1), an indication of one or more beam IDs for which the SIB1 request criterion is satisfied. For example, the indication of the one or more beam IDs for which the SIB1 request criterion is satisfied may be included in source cell system information transmitted by the source network entity 502-1 and received by the UE 120. In such examples, the UE 120 may determine whether the SIB1 request criterion is satisfied is based at least in part on a determination of whether the beam ID of the beam associated with the target cell is included in the one or more beam IDs for which the SIB1 request criterion is satisfied. In some aspects, the source cell (for example, the source network entity 502-1) may also indicate (for example, in the source cell system information) one or more beam IDs for which the SIB1 request criterion is not satisfied.

In some aspects, the SIB1 request criterion may be based at least in part on the SCS for the target cell. In some aspects, the UE 120 may determine whether the SIB1 request criterion is satisfied based at least in part on a determination of whether the SCS for the target cell is different from the SCS for the source cell. In such examples, the SIB1 request criterion may be satisfied if the SCS for the target cell is different from the SCS for the source cell, and the SIB1 request criterion may not be satisfied if the SCS for the target cell is the same as the SCS for the source cell. In some aspects, the UE 120 may determine whether the SIB1 request criterion is satisfied based at least in part on a determination of whether the value for SCS for the target cell is included in a list of one or more SCS values for which the SIB1 request criterion is satisfied. For example, the list of the one or more SCS values for which the SIB1 request criterion is satisfied may be indicated in source cell system information transmitted by the source network entity 502-1 and received by the UE 120.

As further shown in FIG. 5, in a third operation 515, in connection with a determination that the SIB1 request criterion is satisfied, the UE 120 may transmit, to a network entity 502, a request for the dedicated SIB1 for the target cell. For example, the UE 120 may transmit the request for the dedicated SIB1 for the target cell to the network entity 502 in a RACH communication. In some aspects, as shown by operation 515a in FIG. 5, the UE 120 may transmit the request for the dedicated SIB1 for the target cell to the source network entity 502-1 in connection with the determination that the SIB1 request criterion is satisfied. In such examples, the source network entity 502-1 may receive the request for the dedicated SIB1 for the target cell. In some other aspects, as shown by operation 515b in FIG. 5, the UE 120 may transmit the request for the dedicated SIB1 for the target cell to the target network entity 502-2 in connection with the determination that the SIB1 request criterion is satisfied. In such examples, the target network entity 502-2 may receive the request for the dedicated SIB1 for the target cell As further shown in FIG. 5, in a fourth operation 520, the UE 120, based at least in part on transmitting the request for the dedicated SIB1 for the target cell to a network entity 502 (for example, when the SIB1 request criterion is satisfied), may receive an indication of one or more target cell SIB1 parameters from the network entity 502. A network entity 502, based at least in part on receiving the request for the dedicated SIB1 for the target cell from the UE 120, may transmit the one or more target cell SIB1 parameters to the UE 120. In some aspects, as shown by operation 520a in FIG. 5, the UE 120, beast at least in part on transmitting the request for the dedicated SIB1 for the target cell to the source network entity 502-1, may receive the indication of the one or more target cell SIB1 parameters from the source network entity 502-1. In such examples, the source network entity 502-1, based at least in part on receiving the request for the dedicated SIB1 for the target cell from the UE 120, may transmit the indication of the one or more target cell SIB1 parameters to the UE 120. In some other aspects, as shown by operation 520b in FIG. 5, the UE 120, based at least in part on transmitting the request for the dedicated SIB1 for the target cell to the target network entity 502-2, may receive the indication of the one or more target cell SIB1 parameters from the target network entity 502-2. In such examples, the target network entity 502-2, based at least in part on receiving the request for the dedicated SIB1 for the target cell from the UE 120, may transmit the indication of the one or more target cell SIB1 parameters to the UE 120.

In some aspects, the network entity 502 (for example, the source network entity 502-1 or the target network entity 502-2) may transmit the indication of the one or more target cell SIB1 parameters by transmitting the dedicated SIB1 for the target cell (for example, indicating all of the target cell SIB1 parameters) to the UE 120. In such examples, the UE 120 may receive the dedicated SIB1 for the target cell. In some aspects, the network entity 502 (for example, the source network entity 502-1 or the target network entity 502-2) may transmit, and the UE 120 may receive, for each of one or more target cell SIB1 parameters, an indication of a change (for example, a delta value) from a corresponding source cell SIB1 parameter included in the dedicated SIB1 for the source cell. For example, the one or more target cell SIB1 parameters for which the indication of the change is transmitted may include only target cell SIB1 parameters with values different from the corresponding source cell SIB1 parameters. In some aspects, the source cell (for example, the source network entity 502-1) may transmit (for example, in source cell system information), and the UE 120 may receive, an indication of whether the UE 120 is to receive the full dedicated SIB1 for the target cell or the UE 120 is to receive the change indications for one or more target SIB1 parameters, in connection with a request for the dedicated SIB1 for the target cell.

As further shown in FIG. 5, in a fifth operation 525, in connection with a determination that the SIB1 request criterion is not satisfied, the UE 120 may select not to transmit the request for the dedicated SIB1 for the target cell, and the UE 120 may reuse source cell SIB1 parameters for the target cell. In some aspects, the UE 120 may store source cell SIB1 parameters indicated in the source cell SIB1, and the UE 120 may apply the source cell SIB1 parameters to the target cell (for example, for communications with the target network entity 502-2) when the UE 120 camps on the target cell. In some aspects, in a case in which the SIB1 request criterion is not satisfied, the UE 120 may communicate with the target cell (for example, with the target network entity 502-2) using source cell SIB1 parameters, such as the RACH configuration indicated in the source cell SIB1.

Figure 6:
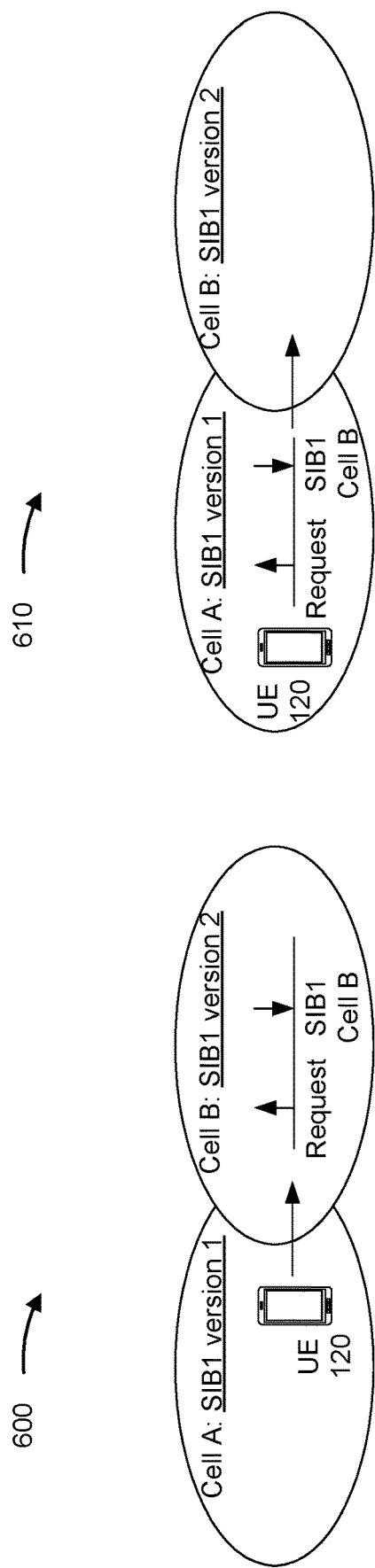

FIG. 6 is a diagram illustrating examples 600 and 610 associated with dedicated SIB1 during idle state reselection, in accordance with the present disclosure. As shown in example 600, a UE 120 may determine to perform idle state cell reselection from a source cell (Cell A) to a target cell (Cell B). Cell A may be associated with SIB1 version 1, and Cell B may be associated with SIB1 version 2. The UE 120 may determine that the SIB1 request criterion is satisfied based at least in part on Cell A and Cell B being associated with different SIB1 versions. As shown in example 600, in some aspects, the UE 120, in connection with the determination that the SIB1 request criterion is satisfied, may transmit a request for the dedicated SIB1 for Cell B (the target cell) to Cell B (the target cell) (for example, to a network entity associated with Cell B), and the UE 120 may receive the dedicated SIB1 for Cell B (the target cell) from Cell B (the target cell) (for example, from a network entity associated with Cell B).

As shown in example 610, a UE 120 may determine to perform idle state cell reselection from a source cell (Cell A) to a target cell (Cell B). Cell A may be associated with SIB1 version 1, and Cell B may be associated with SIB1 version 2. The UE 120 may determine that the SIB1 request criterion is satisfied based at least in part on Cell A and Cell B being associated with different SIB1 versions. As shown in example 610, in some aspects, the UE 120, in connection with the determination that the SIB1 request criterion is satisfied, may transmit a request for the dedicated SIB1 for Cell B (the target cell) to Cell A (the source cell) (for example, to a network entity associated with Cell A), and the UE 120 may receive the dedicated SIB1 for Cell B (the target cell) from Cell A (the source cell) (for example, from a network entity associated with Cell A).

Figure 7:
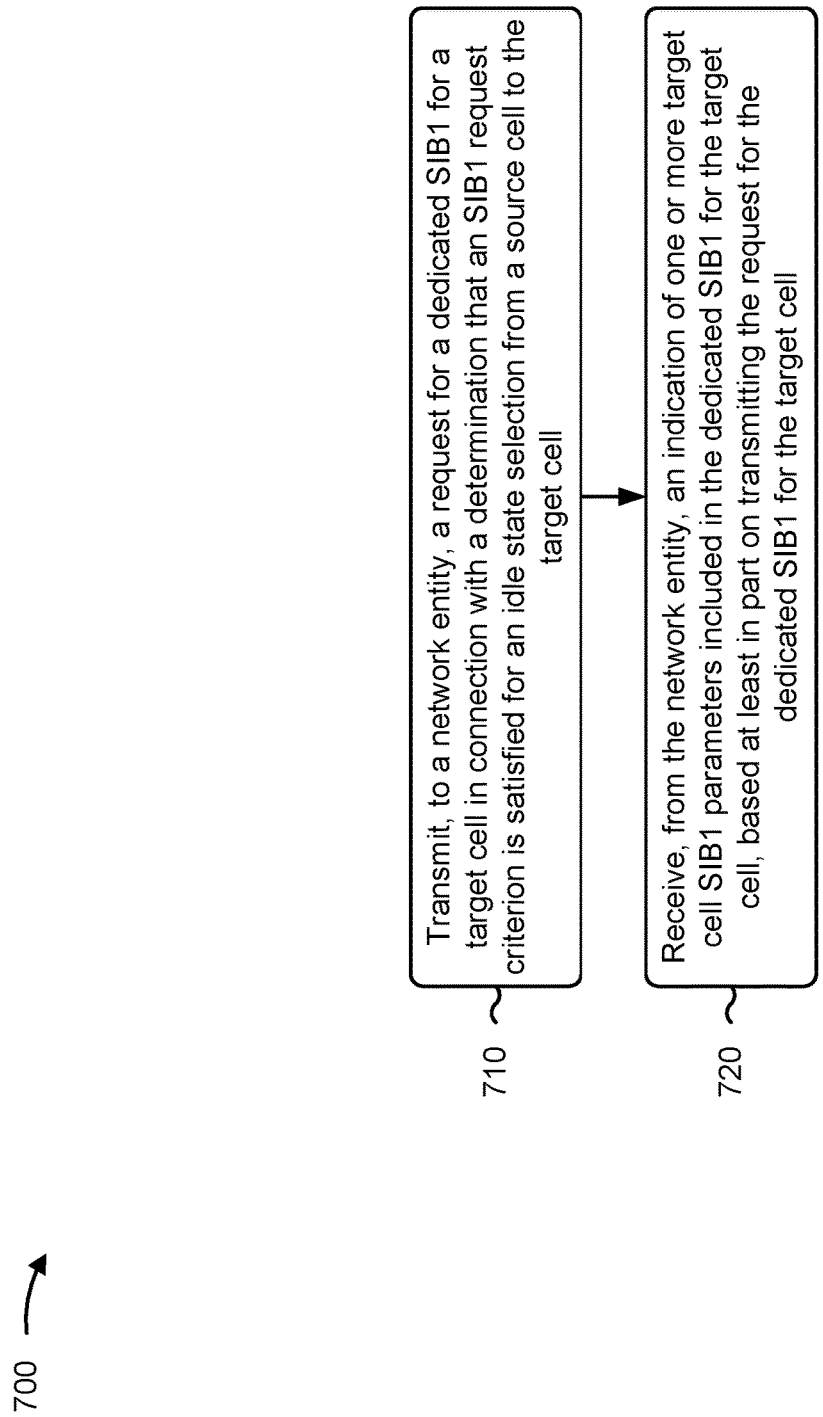
FIG. 7 is a flowchart illustrating an example process performed, for example, by a UE in accordance with the present disclosure.

FIG. 7 is a flowchart illustrating an example process 700 performed, for example, by a UE in accordance with the present disclosure. Example process 700 is an example where the UE (for example, UE 120) performs operations associated with dedicated SIB1 during idle state reselection.

As shown in FIG. 7, in some aspects, process 700 may include selectively transmitting, to a network entity, a request for a dedicated SIB1 for a target cell based at least in part a determination of whether an SIB1 request criterion is satisfied for an idle state cell reselection from a source cell to the target cell (block 710). For example, the UE (such as by using communication manager 140 or transmission component 904, depicted in FIG. 9) may selectively transmit, to a network entity, a request for a dedicated SIB1 for a target cell based at least in part a determination of whether an SIB1 request criterion is satisfied for an idle state cell reselection from a source cell to the target cell, as described above.

As further shown in FIG. 7, in some aspects, process 700 may include receiving, from the network entity, an indication of one or more target cell SIB1 parameters included in the dedicated SIB1 for the target cell, based at least in part on transmitting the request for the dedicated SIB1 for the target cell (block 720). For example, the UE (such as by using communication manager 140 or reception component 902, depicted in FIG. 9) may receive, from the network entity, an indication of one or more target cell SIB1 parameters included in the dedicated SIB1 for the target cell, based at least in part on transmitting the request for the dedicated SIB1 for the target cell, as described above.

Process 700 may include additional aspects, such as any single aspect or any combination of aspects described below or in connection with one or more other processes described elsewhere herein.

In a first additional aspect, selectively transmitting the request for the dedicated SIB1 for the target cell includes transmitting, to the network entity, the request for the dedicated SIB1 for the target cell in connection with a determination that the SIB1 request criterion is satisfied.

In a second additional aspect, alone or in combination with the first aspect, the network entity is associated with the target cell.

In a third additional aspect, alone or in combination with one or more of the first and second aspects, the network entity is associated with the source cell.

In a fourth additional aspect, alone or in combination with one or more of the first through third aspects, receiving the indication of the one or more target cell SIB1 parameters included in the dedicated SIB1 for the target cell includes receiving the dedicated SIB1 for the target cell.

In a fifth additional aspect, alone or in combination with one or more of the first through fourth aspects, receiving the indication of the one or more target cell SIB1 parameters included in the dedicated SIB1 for the target cell includes receiving, for each target cell SIB1 parameter of the one or more target cell SIB1 parameters, an indication of a change from a corresponding source cell SIB1 parameter included in a dedicated SIB1 for the source cell.

In a sixth additional aspect, alone or in combination with one or more of the first through fifth aspects, the determination of whether the SIB1 request criterion is satisfied is based at least in part on a determination of whether a first SIB1 version associated with a dedicated SIB1 for the source cell is different from a second SIB1 version associated with the dedicated SIB1 for the target cell.

In a seventh additional aspect, alone or in combination with one or more of the first through sixth aspects, the determination of whether the SIB1 request criterion is satisfied is based at least in part on a determination of whether a first frequency associated with the source cell is different from a second frequency associated with the target cell.

In an eighth additional aspect, alone or in combination with one or more of the first through seventh aspects, the determination of whether the SIB1 request criterion is satisfied is based at least in part on a determination of whether a time duration from a previous time that the target cell was a serving cell for the UE satisfies a threshold.

In a ninth additional aspect, alone or in combination with one or more of the first through eighth aspects, the determination of whether the SIB1 request criterion is satisfied is based at least in part on a determination of whether an indication to request the dedicated SIB1 for the target cell is received by the UE via the source cell.

In a tenth additional aspect, alone or in combination with one or more of the first through ninth aspects, process 700 includes receiving, via the source cell, an indication of one or more physical cell identifiers for which the SIB1 request criterion is satisfied, and the determination of whether the SIB1 request criterion is satisfied is based at least in part on a determination of whether a physical cell identifier associated with the target cell is included in the one or more physical cell identifiers for which the SIB1 request criterion is satisfied.

In an eleventh additional aspect, alone or in combination with one or more of the first through tenth aspects, process 700 includes receiving, via the source cell, an indication of one or more beam identifiers for which the SIB1 request criterion is satisfied, and the determination of whether the SIB1 request criterion is satisfied is based at least in part on a determination of whether a beam identifier for a beam associated with the target cell is included in the one or more beam identifiers for which the SIB1 request criterion is satisfied.

In a twelfth additional aspect, alone or in combination with one or more of the first through eleventh aspects, the determination of whether the SIB1 request criterion is satisfied is based at least in part on a subcarrier spacing of the target cell.

In a thirteenth additional aspect, alone or in combination with one or more of the first through twelfth aspects, selectively transmitting the request for the dedicated SIB1 for the target cell includes selecting not to transmit the request for the dedicated SIB1 for the target cell in connection with a determination that the SIB1 request criterion is not satisfied.

In a fourteenth additional aspect, alone or in combination with one or more of the first through thirteenth aspects, process 700 includes communicating with the target cell using source cell SIB1 parameters.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
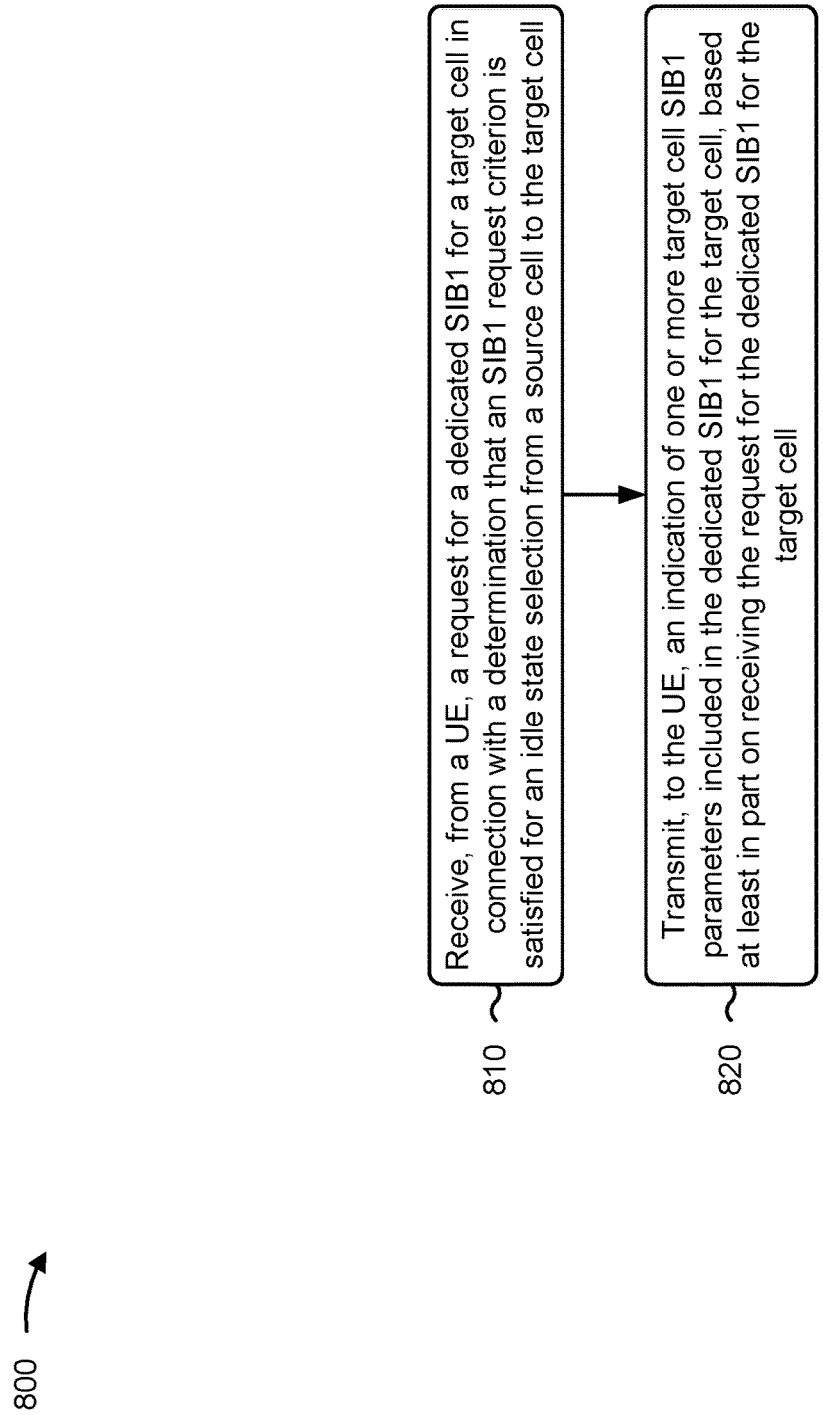
FIG. 8 is a flowchart illustrating an example process performed, for example, by a network entity in accordance with the present disclosure.

FIG. 8 is a flowchart illustrating an example process 800 performed, for example, by a network entity in accordance with the present disclosure. Example process 800 is an example where the network entity (for example, network entity 502) performs operations associated with dedicated SIB1 during idle state reselection.

As shown in FIG. 8, in some aspects, process 800 may include receiving, from a UE, a request for a dedicated SIB1 for a target cell in connection with a determination that an SIB1 request criterion is satisfied for an idle state reselection from a source cell to the target cell (block 810). For example, the network entity (such as by using communication manager 150 or reception component 1002, depicted in FIG. 10) may receive, from a UE, a request for a dedicated SIB1 for a target cell in connection with a determination that an SIB1 request criterion is satisfied for an idle state reselection from a source cell to the target cell, as described above.

As further shown in FIG. 8, in some aspects, process 800 may include transmitting, to the UE, an indication of one or more target cell SIB1 parameters included in the dedicated SIB1 for the target cell, based at least in part on receiving the request for the dedicated SIB1 for the target cell (block 820). For example, the network entity (such as by using communication manager 150 or transmission component 1004, depicted in FIG. 10) may transmit, to the UE, an indication of one or more target cell SIB1 parameters included in the dedicated SIB1 for the target cell, based at least in part on receiving the request for the dedicated SIB1 for the target cell, as described above.

Process 800 may include additional aspects, such as any single aspect or any combination of aspects described below or in connection with one or more other processes described elsewhere herein.

In a first additional aspect, the network entity is associated with the target cell.

In a second additional aspect, alone or in combination with the first aspect, the network entity is associated with the source cell.

In a third additional aspect, alone or in combination with one or more of the first and second aspects, transmitting the indication of the one or more target cell SIB1 parameters included in the dedicated SIB1 for the target cell includes transmitting, to the UE, the dedicated SIB1 for the target cell.

In a fourth additional aspect, alone or in combination with one or more of the first through third aspects, transmitting the indication of the one or more target cell SIB1 parameters included in the dedicated SIB1 for the target cell includes transmitting, for each target cell SIB1 parameter of the one or more target cell SIB1 parameters, an indication of a change from a corresponding source cell SIB1 parameter included in a dedicated SIB1 for the source cell.

In a fifth additional aspect, alone or in combination with one or more of the first through fourth aspects, the SIB1 request criterion is satisfied in connection with a determination that a first SIB1 version associated with a dedicated SIB1 for the source cell is different from a second SIB1 version associated with the dedicated SIB1 for the target cell.

In a sixth additional aspect, alone or in combination with one or more of the first through fifth aspects, the SIB1 request criterion is satisfied in connection with a determination that a first frequency associated with the source cell is different from a second frequency associated with the target cell.

In a seventh additional aspect, alone or in combination with one or more of the first through sixth aspects, the SIB1 request criterion is satisfied in connection with a determination that a time duration from a previous time that the target cell was a serving cell for the UE satisfies a threshold.

In an eighth additional aspect, alone or in combination with one or more of the first through seventh aspects, the SIB1 request criterion is satisfied in connection with receiving, via the source cell, an indication to request the dedicated SIB1 for the target cell.

In a ninth additional aspect, alone or in combination with one or more of the first through eighth aspects, process 800 includes transmitting, to the UE, an indication of one or more physical cell identifiers for which the SIB1 request criterion is satisfied, the SIB1 request criterion is satisfied for the idle state reselection from the source cell to the target cell in connection with a physical cell identifier associated with the target cell being included in the one or more physical cell identifiers for which the SIB1 request criterion is satisfied.

In a tenth additional aspect, alone or in combination with one or more of the first through ninth aspects, process 800 includes transmitting, to the UE, an indication of one or more beam identifiers for which the SIB1 request criterion is satisfied, the SIB1 request criterion is satisfied for the idle state reselection from the source cell to the target cell in connection with a beam identifier for a beam associated with the target cell being included in the one or more beam identifiers for which the SIB1 request criterion is satisfied.

In an eleventh additional aspect, alone or in combination with one or more of the first through tenth aspects, the determination that the SIB1 request criterion is satisfied is based at least in part on a subcarrier spacing of the target cell.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
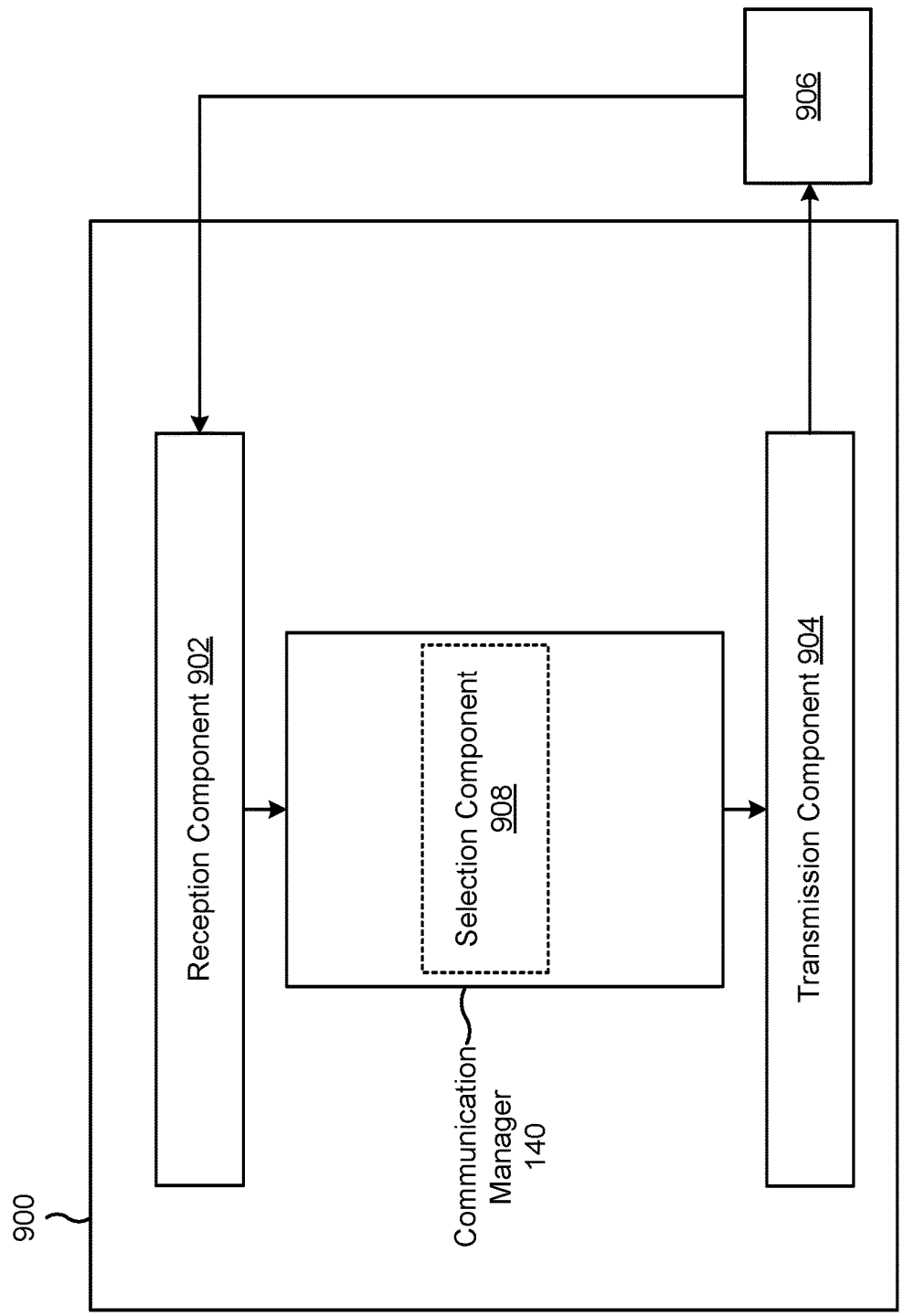
FIGS. 9-10 are diagrams of example apparatuses for wireless communication in accordance with the present disclosure.

FIG. 9 is a diagram of an example apparatus 900 for wireless communication in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 5-6. Additionally or alternatively, the apparatus 900 may be configured to perform one or more processes described herein, such as process 700 of FIG. 7, or a combination thereof. In some aspects, the apparatus 900 may include one or more components of the UE described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The communication manager 140 may transmit or may cause the transmission component 904 to selectively transmit, to a network entity, a request for a dedicated SIB1 for a target cell based at least in part a determination of whether an SIB1 request criterion is satisfied for an idle state cell reselection from a source cell to the target cell. The communication manager 140 may receive or may cause the reception component 902 to receive, from the network entity, an indication of one or more target cell SIB1 parameters included in the dedicated SIB1 for the target cell, based at least in part on transmitting the request for the dedicated SIB1 for the target cell. In some aspects, the communication manager 140 may perform one or more operations described elsewhere herein as being performed by one or more components of the communication manager 140.

The communication manager 140 may include a controller/processor, a memory, or a combination thereof, of the network entity described above in connection with FIG. 2. In some aspects, the communication manager 140 includes a set of components, such as a selection component 908, among other examples. Alternatively, the set of components may be separate and distinct from the communication manager 140. In some aspects, one or more components of the set of components may include or may be implemented within a controller/processor, a memory, or a combination thereof, of the network entity described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The selection component 908 or the transmission component 904 may selectively transmit, to a network entity, a request for a dedicated SIB1 for a target cell based at least in part a determination of whether an SIB1 request criterion is satisfied for an idle state cell reselection from a source cell to the target cell. The reception component 902 may receive, from the network entity, an indication of one or more target cell SIB1 parameters included in the dedicated SIB1 for the target cell, based at least in part on transmitting the request for the dedicated SIB1 for the target cell.

The reception component 902 may receive, via the source cell, an indication of one or more physical cell identifiers for which the SIB1 request criterion is satisfied, wherein the determination of whether the SIB1 request criterion is satisfied is based at least in part on a determination of whether a physical cell identifier associated with the target cell is included in the one or more physical cell identifiers for which the SIB1 request criterion is satisfied.

The reception component 902 may receive, via the source cell, an indication of one or more beam identifiers for which the SIB1 request criterion is satisfied, wherein the determination of whether the SIB1 request criterion is satisfied is based at least in part on a determination of whether a beam identifier for a beam associated with the target cell is included in the one or more beam identifiers for which the SIB1 request criterion is satisfied.

The reception component 902 or the transmission component 904 may communicate with the target cell using source cell SIB1 parameters.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
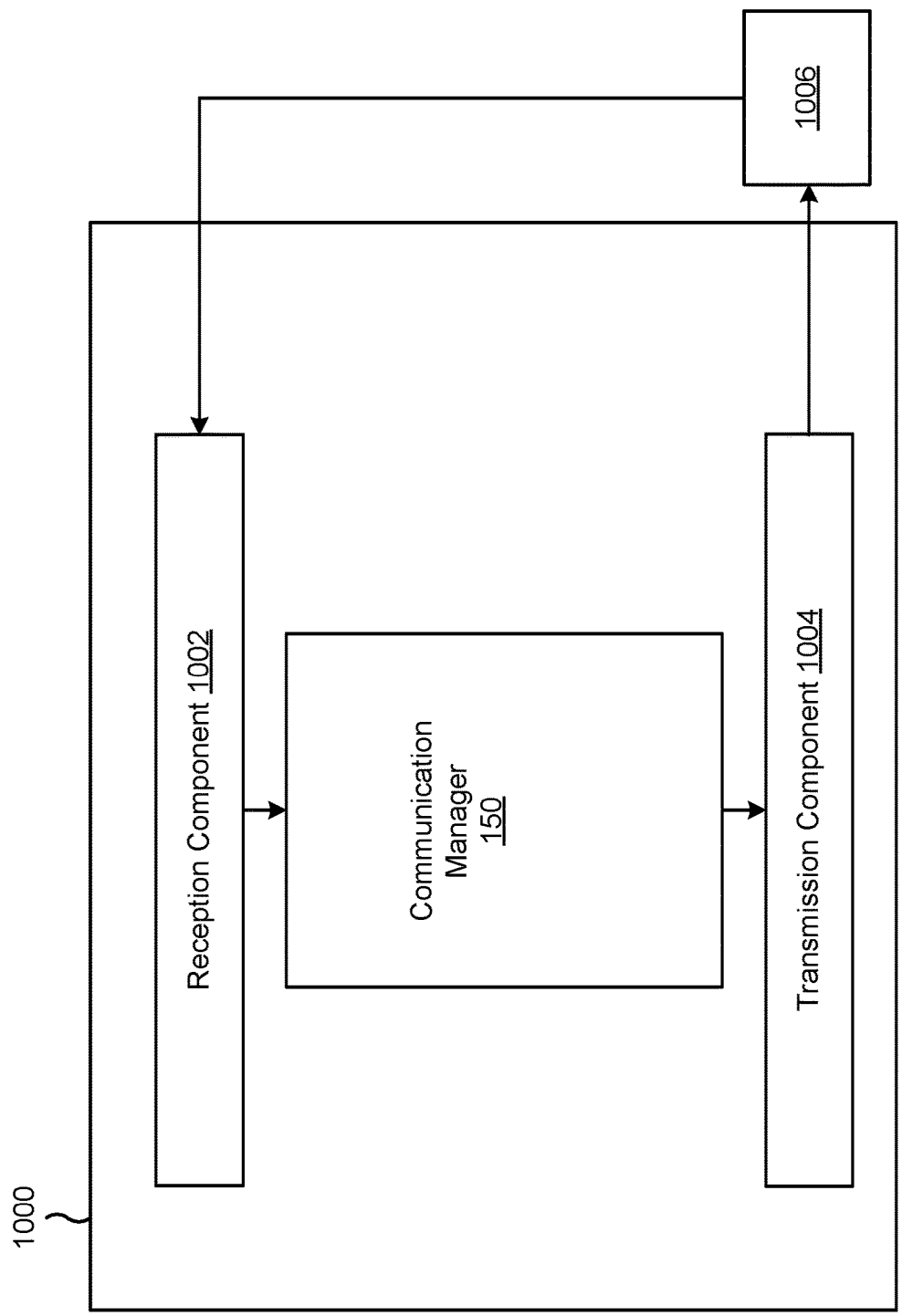

FIG. 10 is a diagram of an example apparatus 1000 for wireless communication in accordance with the present disclosure. The apparatus 1000 may be a network entity, or a network entity may include the apparatus 1000. In some aspects, the apparatus 1000 includes a reception component 1002, a transmission component 1004, and a communication manager 150, which may be in communication with one another (for example, via one or more buses). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 5-6. Additionally or alternatively, the apparatus 1000 may be configured to perform one or more processes described herein, such as process 800 of FIG. 8, or a combination thereof. In some aspects, the apparatus 1000 may include one or more components of the network entity described above in connection with FIG. 2.

The reception component 1002 may receive communications, such as reference signals, control information, data communications, or a combination thereof, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, a memory, or a combination thereof, of the network entity described above in connection with FIG. 2.

The transmission component 1004 may transmit communications, such as reference signals, control information, data communications, or a combination thereof, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described above in connection with FIG. 2. In some aspects, the transmission component 1004 may be co-located with the reception component 1002 in a transceiver.

The communication manager 150 may receive or may cause the reception component 1002 to receive, from a UE, a request for a dedicated SIB1 for a target cell in connection with a determination that an SIB1 request criterion is satisfied for an idle state reselection from a source cell to the target cell. The communication manager 150 may transmit or may cause the transmission component 1004 to transmit, to the UE, an indication of one or more target cell SIB1 parameters included in the dedicated SIB1 for the target cell, based at least in part on receiving the request for the dedicated SIB1 for the target cell. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network entity described above in connection with FIG. 2.

The reception component 1002 may receive, from a UE, a request for a dedicated SIB1 for a target cell in connection with a determination that an SIB1 request criterion is satisfied for an idle state reselection from a source cell to the target cell. The transmission component 1004 may transmit, to the UE, an indication of one or more target cell SIB1 parameters included in the dedicated SIB1 for the target cell, based at least in part on receiving the request for the dedicated SIB1 for the target cell.

The transmission component 1004 may transmit, to the UE, an indication of one or more physical cell identifiers for which the SIB1 request criterion is satisfied, wherein the SIB1 request criterion is satisfied for the idle state reselection from the source cell to the target cell in connection with a physical cell identifier associated with the target cell being included in the one or more physical cell identifiers for which the SIB1 request criterion is satisfied.

The transmission component 1004 may transmit, to the UE, an indication of one or more beam identifiers for which the SIB1 request criterion is satisfied, wherein the SIB1 request criterion is satisfied for the idle state reselection from the source cell to the target cell in connection with a beam identifier for a beam associated with the target cell being included in the one or more beam identifiers for which the SIB1 request criterion is satisfied.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: selectively transmitting, to a network entity, a request for a dedicated system information block type 1 (SIB1) for a target cell based at least in part a determination of whether an SIB1 request criterion is satisfied for an idle state cell reselection from a source cell to the target cell; and receiving, from the network entity, an indication of one or more target cell SIB1 parameters included in the dedicated SIB1 for the target cell, based at least in part on transmitting the request for the dedicated SIB1 for the target cell.

Aspect 2: The method of Aspect 1, wherein selectively transmitting the request for the dedicated SIB1 for the target cell comprises: transmitting, to the network entity, the request for the dedicated SIB1 for the target cell in connection with a determination that the SIB1 request criterion is satisfied.

Aspect 3: The method of Aspect 2, wherein the network entity is associated with the target cell.

Aspect 4: The method of Aspect 2, wherein the network entity is associated with the source cell.

Aspect 5: The method of any of Aspects 2-4, wherein receiving the indication of the one or more target cell SIB1 parameters included in the dedicated SIB1 for the target cell comprises: receiving the dedicated SIB1 for the target cell.

Aspect 6: The method of any of Aspects 2-4, wherein receiving the indication of the one or more target cell SIB1 parameters included in the dedicated SIB1 for the target cell comprises: receiving, for each target cell SIB1 parameter of the one or more target cell SIB1 parameters, an indication of a change from a corresponding source cell SIB1 parameter included in a dedicated SIB1 for the source cell.

Aspect 7: The method of any of Aspects 1-6, wherein the determination of whether the SIB1 request criterion is satisfied is based at least in part on a determination of whether a first SIB1 version associated with a dedicated SIB1 for the source cell is different from a second SIB1 version associated with the dedicated SIB1 for the target cell.

Aspect 8: The method of any of Aspects 1-7, wherein the determination of whether the SIB1 request criterion is satisfied is based at least in part on a determination of whether a first frequency associated with the source cell is different from a second frequency associated with the target cell.

Aspect 9: The method of any of Aspects 1-8, wherein the determination of whether the SIB1 request criterion is satisfied is based at least in part on a determination of whether a time duration from a previous time that the target cell was a serving cell for the UE satisfies a threshold.

Aspect 10: The method of any of Aspects 1-9, wherein the determination of whether the SIB1 request criterion is satisfied is based at least in part on a determination of whether an indication to request the dedicated SIB1 for the target cell is received by the UE via the source cell.

Aspect 11: The method of any of Aspects 1-10, further comprising: receiving, via the source cell, an indication of one or more physical cell identifiers for which the SIB1 request criterion is satisfied, wherein the determination of whether the SIB1 request criterion is satisfied is based at least in part on a determination of whether a physical cell identifier associated with the target cell is included in the one or more physical cell identifiers for which the SIB1 request criterion is satisfied.

Aspect 12: The method of any of Aspects 1-11, further comprising: receiving, via the source cell, an indication of one or more beam identifiers for which the SIB1 request criterion is satisfied, wherein the determination of whether the SIB1 request criterion is satisfied is based at least in part on a determination of whether a beam identifier for a beam associated with the target cell is included in the one or more beam identifiers for which the SIB1 request criterion is satisfied.

Aspect 13: The method of any of Aspects 1-12, wherein the determination of whether the SIB1 request criterion is satisfied is based at least in part on a subcarrier spacing of the target cell.

Aspect 14: The method of any of Aspects 1 and 7-13, wherein selectively transmitting the request for the dedicated SIB1 for the target cell comprises: selecting not to transmit the request for the dedicated SIB1 for the target cell in connection with a determination that the SIB1 request criterion is not satisfied.

Aspect 15: The method of Aspect 14, further comprising: communicating with the target cell using source cell SIB1 parameters.

Aspect 16: A method of wireless communication performed by a network entity, comprising: receiving, from a user equipment (UE), a request for a dedicated system information block type 1 (SIB1) for a target cell in connection with a determination that an SIB1 request criterion is satisfied for an idle state reselection from a source cell to the target cell; and transmitting, to the UE, an indication of one or more target cell SIB1 parameters included in the dedicated SIB1 for the target cell, based at least in part on receiving the request for the dedicated SIB1 for the target cell.

Aspect 17: The method of Aspect 16, wherein the network entity is associated with the target cell.

Aspect 18: The method of Aspect 16, wherein the network entity is associated with the source cell.

Aspect 19: The method of any of Aspects 16-18, wherein transmitting the indication of the one or more target cell SIB1 parameters included in the dedicated SIB1 for the target cell comprises: transmitting, to the UE, the dedicated SIB1 for the target cell.

Aspect 20: The method of any of Aspects 16-18, wherein transmitting the indication of the one or more target cell SIB1 parameters included in the dedicated SIB1 for the target cell comprises: transmitting, for each target cell SIB1 parameter of the one or more target cell SIB1 parameters, an indication of a change from a corresponding source cell SIB1 parameter included in a dedicated SIB1 for the source cell.

Aspect 21: The method of any of Aspects 16-20, wherein the SIB1 request criterion is satisfied in connection with a determination that a first SIB1 version associated with a dedicated SIB1 for the source cell is different from a second SIB1 version associated with the dedicated SIB1 for the target cell.

Aspect 22: The method of any of Aspects 16-21, wherein the SIB1 request criterion is satisfied in connection with a determination that a first frequency associated with the source cell is different from a second frequency associated with the target cell.

Aspect 23: The method of any of Aspects 16-22, wherein the SIB1 request criterion is satisfied in connection with a determination that a time duration from a previous time that the target cell was a serving cell for the UE satisfies a threshold.

Aspect 24: The method of any of Aspects 16-23, wherein the SIB1 request criterion is satisfied in connection with receiving, via the source cell, an indication to request the dedicated SIB1 for the target cell.

Aspect 25: The method of any of Aspects 16-24, further comprising: transmitting, to the UE, an indication of one or more physical cell identifiers for which the SIB1 request criterion is satisfied, wherein the SIB1 request criterion is satisfied for the idle state reselection from the source cell to the target cell in connection with a physical cell identifier associated with the target cell being included in the one or more physical cell identifiers for which the SIB1 request criterion is satisfied.

Aspect 26: The method of any of Aspects 16-25, further comprising: transmitting, to the UE, an indication of one or more beam identifiers for which the SIB1 request criterion is satisfied, wherein the SIB1 request criterion is satisfied for the idle state reselection from the source cell to the target cell in connection with a beam identifier for a beam associated with the target cell being included in the one or more beam identifiers for which the SIB1 request criterion is satisfied.

Aspect 27: The method of any of Aspects 16-26, wherein the determination that the SIB1 request criterion is satisfied is based at least in part on a subcarrier spacing of the target cell.

Aspect 28: An apparatus for wireless communication at a device, comprising a processor; memory coupled with the processor; and instructions stored in the memory and executable by the processor to cause the apparatus to perform the method of one or more of Aspects 1-15.

Aspect 29: A device for wireless communication, comprising a memory and one or more processors coupled to the memory, the one or more processors configured to perform the method of one or more of Aspects 1-15.

Aspect 30: An apparatus for wireless communication, comprising at least one means for performing the method of one or more of Aspects 1-15.

Aspect 31: A non-transitory computer-readable medium storing code for wireless communication, the code comprising instructions executable by a processor to perform the method of one or more of Aspects 1-15.

Aspect 32: A non-transitory computer-readable medium storing a set of instructions for wireless communication, the set of instructions comprising one or more instructions that, when executed by one or more processors of a device, cause the device to perform the method of one or more of Aspects 1-15.

Aspect 33: An apparatus for wireless communication at a device, comprising a processor; memory coupled with the processor; and instructions stored in the memory and executable by the processor to cause the apparatus to perform the method of one or more of Aspects 16-27.

Aspect 34: A device for wireless communication, comprising a memory and one or more processors coupled to the memory, the one or more processors configured to perform the method of one or more of Aspects 16-27.

Aspect 35: An apparatus for wireless communication, comprising at least one means for performing the method of one or more of Aspects 16-27.

Aspect 36: A non-transitory computer-readable medium storing code for wireless communication, the code comprising instructions executable by a processor to perform the method of one or more of Aspects 16-27.

Aspect 37: A non-transitory computer-readable medium storing a set of instructions for wireless communication, the set of instructions comprising one or more instructions that, when executed by one or more processors of a device, cause the device to perform the method of one or more of Aspects 16-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   at least one memory; and
   at least one processor communicatively coupled with the at least one memory, the at least one processor configured to cause the UE to:
   selectively transmit, to a network entity, a request for a dedicated system information block type 1 (SIB1) for a target cell based at least in part a determination of whether an SIB1 request criterion is satisfied for an idle state cell reselection from a source cell to the target cell, wherein the determination of whether the SIB1 request criterion is satisfied is based at least in part on at least one of: a determination of whether a first frequency associated with the source cell is different from a second frequency associated with the target cell, a determination of whether a time duration from a previous time that the target cell was a serving cell for the UE satisfies a threshold, a determination of whether a physical cell identifier associated with the target cell is included in one or more physical cell identifiers for which the SIB1 request criterion is satisfied, or a subcarrier spacing of the target cell; and
   receive, from the network entity, an indication of one or more target cell SIB1 parameters included in the dedicated SIB1 for the target cell, based at least in part on a transmission of the request for the dedicated SIB1 for the target cell.

2. The UE of claim 1, wherein, to cause the UE to selectively transmit the request for the dedicated SIB1 for the target cell, the at least one processor is configured to cause the UE to:
  transmit, to the network entity, the request for the dedicated SIB1 for the target cell in connection with a determination that the SIB1 request criterion is satisfied.

3. The UE of claim 1, wherein the network entity is associated with the target cell.

4. The UE of claim 1, wherein the network entity is associated with the source cell.

5. The UE of claim 1, wherein, to cause the UE to receive the indication of the one or more target cell SIB1 parameters included in the dedicated SIB1 for the target cell, the at least one processor is configured to cause the UE to:
  receive the dedicated SIB1 for the target cell.

6. The UE of claim 1, wherein, to cause the UE to receive the indication of the one or more target cell SIB1 parameters included in the dedicated SIB1 for the target cell, the at least one processor is configured to cause the UE to:
  receive, for each target cell SIB1 parameter of the one or more target cell SIB1 parameters, an indication of a change from a corresponding source cell SIB1 parameter included in a dedicated SIB1 for the source cell.

7. The UE of claim 1, wherein the determination of whether the SIB1 request criterion is satisfied is further based at least in part on a determination of whether a first SIB1 version associated with a dedicated SIB1 for the source cell is different from a second SIB1 version associated with the dedicated SIB1 for the target cell.

8. The UE of claim 1, wherein the determination of whether the SIB1 request criterion is satisfied is further based at least in part on a determination of whether an indication to request the dedicated SIB1 for the target cell is received by the UE via the source cell.

9. The UE of claim 1, wherein the at least one processor is further configured to cause the UE to:
  receive, via the source cell, an indication of the one or more physical cell identifiers for which the SIB1 request criterion is satisfied.

10. The UE of claim 1, wherein the at least one processor is further configured to cause the UE to:
  receive, via the source cell, an indication of one or more beam identifiers for which the SIB1 request criterion is satisfied, wherein the determination of whether the SIB1 request criterion is satisfied is further based at least in part on a determination of whether a beam identifier for a beam associated with the target cell is included in the one or more beam identifiers for which the SIB1 request criterion is satisfied.

11. The UE of claim 1, wherein, to cause the UE to selectively transmit the request for the dedicated SIB1 for the target cell, the at least one processor is configured to cause the UE to:
  select not to transmit the request for the dedicated SIB1 for the target cell in connection with a determination that the SIB1 request criterion is not satisfied.

12. The UE of claim 11, wherein the at least one processor is further configured to cause the UE to:
  communicate with the target cell using source cell SB1 parameters.

13. A network entity for wireless communication, comprising:
  at least one memory; and
  at least one processor communicatively coupled with the at least one memory, the at least one processor configured to cause the network entity to:
    receive, from a user equipment (UE), a request for a dedicated system information block type 1 (SIB1) for a target cell in connection with a determination that an SIB1 request criterion is satisfied for an idle state reselection from a source cell to the target cell, wherein the determination that the SIB1 request criterion is satisfied is based at least in part on at least one of: a determination of whether a first frequency associated with the source cell is different from a second frequency associated with the target cell, a determination of whether a time duration from a previous time that the target cell was a serving cell for the UE satisfies a threshold, a determination of whether a physical cell identifier associated with the target cell is included in one or more physical cell identifiers for which the SIB1 request criterion is satisfied, or a subcarrier spacing of the target cell; and
    transmit, to the UE, an indication of one or more target cell SIB1 parameters included in the dedicated SIB1 for the target cell, based at least in part on receiving-a reception of the request for the dedicated SIB1 for the target cell.

14. The network entity of claim 13, wherein the network entity is associated with the target cell.

15. The network entity of claim 13, wherein the network entity is associated with the source cell.

16. The network entity of claim 13, wherein, to cause the network entity to transmit the indication of the one or more target cell SIB1 parameters included in the dedicated SIB1 for the target cell, the at least one processor is configured to cause the network entity to:
  transmit the dedicated SIB1 for the target cell.

17. The network entity of claim 13, wherein the determination that the SIB1 request criterion is satisfied is further based at least in part on a determination of whether a first SIB1 version associated with a dedicated SIB1 for the source cell is different from a second SIB1 version associated with the dedicated SIB1 for the target cell.

18. The network entity of claim 13, wherein the determination that the SIB1 request criterion is satisfied is further based at least in part on a determination of whether an indication to request the dedicated SIB1 for the target cell is received by the UE via the source cell.

19. The network entity of claim 13, wherein the at least one processor is further configured to cause the network entity to:
  transmit, via the source cell, an indication of one or more beam identifiers for which the SIB1 request criterion is satisfied, wherein the determination that the SIB1 request criterion is satisfied is further based at least in part on a determination of whether a beam identifier for a beam associated with the target cell is included in the one or more beam identifiers for which the SIB1 request criterion is satisfied.

20. A method of wireless communication performed by a user equipment (UE), comprising:
  selectively transmitting, to a network entity, a request for a dedicated system information block type 1 (SIB1) for a target cell based at least in part a determination of whether an SIB1 request criterion is satisfied for an idle state cell reselection from a source cell to the target cell, wherein the determination of whether the SIB1 request criterion is satisfied is based at least in part on at least one of: a determination of whether a first frequency associated with the source cell is different from a second frequency associated with the target cell, a determination of whether a time duration from a previous time that the target cell was a serving cell for the UE satisfies a threshold, a determination of whether a physical cell identifier associated with the target cell is included in one or more physical cell identifiers for which the SIB1 request criterion is satisfied, or a subcarrier spacing of the target cell; and receiving, from the network entity, an indication of one or more target cell SIB1 parameters included in the dedicated SIB1 for the target cell, based at least in part on transmitting the request for the dedicated SIB1 for the target cell.

21. The method of claim 20, wherein selectively transmitting the request for the dedicated SIB1 for the target cell comprises:

transmitting, to the network entity, the request for the dedicated SIB1 for the target cell in connection with a determination that the SIB1 request criterion is satisfied.

22. The method of claim 20, wherein the determination of whether the SIB1 request criterion is satisfied is further based at least in part on a determination of whether a first SIB1 version associated with a dedicated SIB1 for the source cell is different from a second SIB1 version associated with the dedicated SIB1 for the target cell.

23. The method of claim 20, wherein the determination of whether the SIB1 request criterion is satisfied is further based at least in part on a determination of whether an indication to request the dedicated SIB1 for the target cell is received by the UE via the source cell.

24. The method of claim 20, further comprising:

receiving, via the source cell, an indication of the one or more physical cell identifiers for which the SIB1 request criterion is satisfied.

25. The method of claim 20, further comprising:

receiving, via the source cell, an indication of one or more beam identifiers for which the SIB1 request criterion is satisfied, wherein the determination of whether the SIB1 request criterion is satisfied is further based at least in part on a determination of whether a beam identifier for a beam associated with the target cell is included in the one or more beam identifiers for which the SIB1 request criterion is satisfied.

26. The method of claim 20, wherein selectively transmitting the request for the dedicated SIB1 for the target cell comprises:

selecting not to transmit the request for the dedicated SIB1 for the target cell in connection with a determination that the SIB1 request criterion is not satisfied.

27. The method of claim 26, further comprising:

communicating with the target cell using source cell SB1 parameters.

28. The method of claim 20, wherein receiving the indication of the one or more target cell SIB1 parameters included in the dedicated SIB1 for the target cell comprises:

receiving the dedicated SIB1 for the target cell.

29. The method of claim 20, wherein receiving the indication of the one or more target cell SIB1 parameters included in the dedicated SIB1 for the target cell comprises:

receiving, for each target cell SIB1 parameter of the one or more target cell SIB1 parameters, an indication of a change from a corresponding source cell SIB1 parameter included in a dedicated SIB1 for the source cell.

30. A method of wireless communication performed by a network entity, comprising:

receiving, from a user equipment (UE), a request for a dedicated system information block type 1 (SIB1) for a target cell in connection with a determination that an SIB1 request criterion is satisfied for an idle state reselection from a source cell to the target cell, wherein the determination that the SIB1 request criterion is satisfied is based at least in part on at least one of: a determination of whether a first frequency associated with the source cell is different from a second frequency associated with the target cell, a determination of whether a time duration from a previous time that the target cell was a serving cell for the UE satisfies a threshold, a determination of whether a physical cell identifier associated with the target cell is included in one or more physical cell identifiers for which the SIB1 request criterion is satisfied, or a subcarrier spacing of the target cell; and transmitting, to the UE, an indication of one or more target cell SIB1 parameters included in the dedicated SIB1 for the target cell, based at least in part on receiving the request for the dedicated SIB1 for the target cell.

* * * * *